United States Patent
Lee et al.

(10) Patent No.: US 11,978,595 B2
(45) Date of Patent: May 7, 2024

(54) CAPACITOR COMPONENT INCLUDING THROUGH-HOLE STRUCTURE TO INCREASE CAPACITANCE

(71) Applicant: SAMSUNG ELECTRO-MECHANICS CO., LTD., Suwon-si (KR)

(72) Inventors: Sang Jong Lee, Suwon-si (KR); Su Bong Jang, Suwon-si (KR); Min Cheol Park, Suwon-si (KR); Tae Ho Yun, Suwon-si (KR); Han Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 103 days.

(21) Appl. No.: 17/712,424

(22) Filed: Apr. 4, 2022

(65) Prior Publication Data
US 2023/0197347 A1  Jun. 22, 2023

(30) Foreign Application Priority Data
Dec. 16, 2021 (KR) .......................... 10-2021-0180299

(51) Int. Cl.
*H01G 4/248* (2006.01)
*H01G 4/232* (2006.01)
*H01G 4/30* (2006.01)

(52) U.S. Cl.
CPC ............. *H01G 4/248* (2013.01); *H01G 4/232* (2013.01); *H01G 4/30* (2013.01)

(58) Field of Classification Search
CPC ........ H01G 4/30; H01G 4/1209; H01G 4/012; Y02E 60/13
See application file for complete search history.

(56) References Cited

U.S. PATENT DOCUMENTS 8,912,522 B2   12/2014  Rubloff et al.
2012/0146182 A1*  6/2012  Oganesian .............. H01L 28/91
                                                   257/532

(Continued)

FOREIGN PATENT DOCUMENTS

KR   10-2019-0033239 A   3/2019

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A capacitor component includes a body having first surface and second surfaces opposing each other and including through-holes penetrating through the first surface and the second surface, a first electrode covering an inner wall of each of the plurality of through-holes, a first common electrode covering the first surface and connected to the first electrode, a dielectric layer surrounded by the first electrode in the through-hole, a second electrode surrounded by the dielectric layer in the through-hole, a second common electrode layer covering the second surface and connected to the second electrode, a first external electrode disposed on at least one of a plurality of side surfaces of the body and connected to the first common electrode layer, and a second external electrode disposed on at least one of the plurality of side surfaces of the body and connected to the second common electrode layer.

18 Claims, 8 Drawing Sheets

(56) References Cited

U.S. PATENT DOCUMENTS

| | | | | |
|---|---|---|---|---|
| 2012/0300360 A1* | 11/2012 | Take | ................. | H01G 4/30 |
| | | | | 361/301.4 |
| 2015/0318296 A1* | 11/2015 | Kim | ................. | H10B 41/40 |
| | | | | 257/296 |
| 2016/0212843 A1* | 7/2016 | Park | ................. | H01G 4/232 |
| 2018/0308638 A1* | 10/2018 | Ryou | ................. | H01L 28/75 |
| 2019/0088419 A1 | 3/2019 | Ryou et al. | | |
| 2019/0096587 A1* | 3/2019 | Shin | ................. | H01G 4/1272 |
| 2020/0051749 A1* | 2/2020 | Suemasa | ................. | H01G 4/33 |
| 2020/0137889 A1* | 4/2020 | Yook | ................. | H01L 28/91 |
| 2022/0246361 A1* | 8/2022 | Suemasa | ................. | H05K 1/181 |
| 2022/0384113 A1* | 12/2022 | Take | ................. | H01G 4/33 |

* cited by examiner

CAPACITOR COMPONENT INCLUDING THROUGH-HOLE STRUCTURE TO INCREASE CAPACITANCE

CROSS-REFERENCE TO RELATED APPLICATION(S)

This application claims benefit of priority to Korean Patent Application No. 10-2021-0180299 filed on Dec. 16, 2021 in the Korean Intellectual Property Office, the disclosure of which is incorporated herein by reference in its entirety.

TECHNICAL FIELD

The present disclosure relates to a capacitor component.

BACKGROUND

Capacitors are installed on the printed circuit boards of various electronic products such as imaging devices including liquid crystal displays (LCDs) and plasma display panels (PDPs), computers, smartphones, and mobile phones to allow electricity to be charged therein and discharged therefrom. Recently, portable IT products such as smartphones and wearable equipment have been thinned, and accordingly, the need for thinning of passive elements to reduce an overall package thickness has also been increased.

According to this trend, demand for thin film capacitors that may implement a lower thickness has also increased, and thin film capacitors have the advantage of being able to implement thin capacitors using thin film technology. In addition, since the thin film capacitors advantageously have low ESL, unlike conventional multilayer ceramic capacitors, application thereof to decoupling capacitors for an application processor (AP) has been discussed. In order to use thin film capacitors as decoupling capacitors for such an AP, the thin film capacitors are manufactured in the form of landside capacitors (LSCs).

Meanwhile, trench-type capacitors have been developed in order to increase capacitance of the capacitors in a limited space, in which a capacitor structure is formed after a trench is formed in a silicon substrate. The trench capacitors are suitable for increasing capacitance by increasing a surface area of electrodes, but require complicated semiconductor processing technology, and in addition, it may be difficult to form a plurality of dielectrics in a trench in terms of a dielectric thickness satisfying a withstand voltage condition, and therefore, it is not easy to implement ultra-high capacitance.

SUMMARY

Exemplary embodiments provide a capacitor component in which a capacitor region has a large surface area, thereby improving electric capacity.

According to an aspect of the present disclosure, a capacitor component may include: a body having a first surface and a second surface opposing each other in a first direction of the body and including a plurality of through-holes penetrating through the first surface and the second surface; a first electrode covering an inner wall of one of more of the plurality of through-holes; a first common electrode covering the first surface and connected to the first electrode; a dielectric layer surrounded by the first electrode in the one or more of the through-holes; a second electrode surrounded by the dielectric layer in the one or more of the through-holes; a second common electrode layer covering the second surface and connected to the second electrode; a first external electrode disposed on at least one of a plurality of side surfaces connecting the first and second surfaces to each other in the body and connected to a side surface of the first common electrode layer; and a second external electrode disposed on at least one of the plurality of side surfaces connecting the first and second surfaces to each other in the body and connected to a side surface of the second common electrode layer.

The first electrode and the first common electrode layer may have an integral structure.

The second electrode and the second common electrode may have an integral structure.

The dielectric layer may extend to cover the second surface of the body.

A region of the dielectric layer covering the second surface of the body may be disposed between the body and the second common electrode.

The region of the dielectric layer covering the second surface of the body may be in contact with the second surface of the body.

The plurality of through-holes may be regularly arranged in a lattice structure.

The capacitor component may further include an insulating layer disposed on an outer side of the first and second common electrode layers in the first direction to cover the first and second common electrode layers.

The insulating layer disposed on the first surface may be in contact with the dielectric layer.

The first common electrode layer may be connected to the first external electrode and may not be connected to the second external electrode on the first surface of the body.

The second common electrode layer may be connected to the second external electrode and may not be connected to the first external electrode on the second surface of the body.

In the first direction, a length of the second electrode may be greater than a length of the body.

The first and second external electrodes may extend from side surfaces of the body to the first and second surfaces.

The capacitor component may further include: a first connection layer disposed between the first common electrode layer and the first external electrode on the first surface of the body and connecting the first common electrode layer and the first external electrode; and a second connection layer disposed between the second common electrode layer and the second external electrode on the second surface of the body and connecting the second common electrode layer and the second external electrode.

The first and second external electrodes may be disposed on the same side surface of the body.

The first external electrode may cover the first common electrode on the first surface of the body and extend to be connected to the first common electrode, and the second external electrode may cover the second common electrode on the second surface of the body and extend to be connected to the second common electrode.

The dielectric layer may extend to be disposed between the first common electrode and the second electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
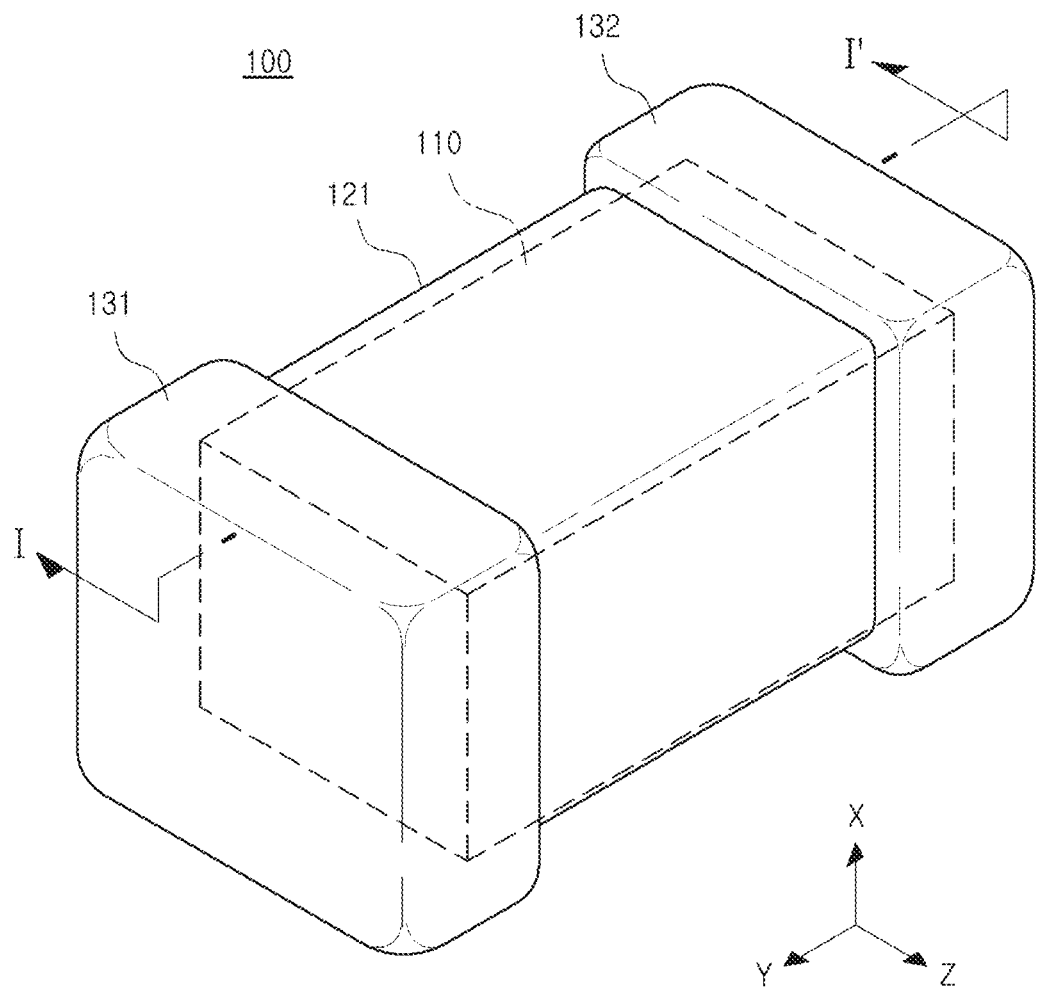
FIG. 1 is a perspective view schematically illustrating an exterior of a capacitor component according to an exemplary embodiment in the present disclosure.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

To clarify the present invention, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings.

Figure 2:
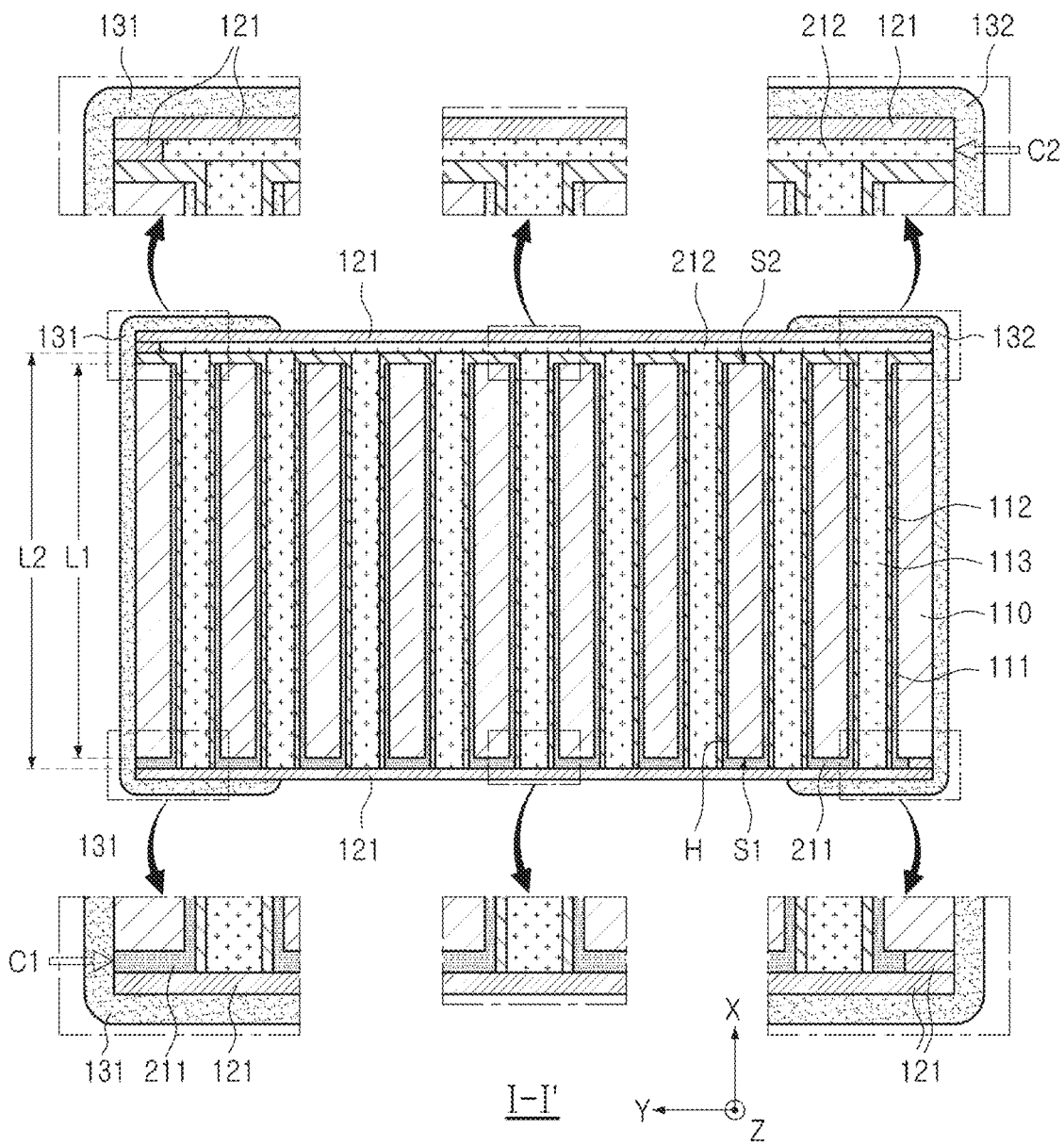
FIG. 2 is a cross-sectional view of the capacitor component of FIG. 1.

FIG. 1 is a perspective view schematically illustrating an exterior of a capacitor component according to an exemplary embodiment in the present disclosure, and FIG. 2 is a cross-sectional view of the capacitor component of FIG. 1. FIGS. 3 to 6 are views separately illustrating main components of the capacitor component in the exemplary embodiment of FIG. 1

Referring to FIGS. 1 and 2, a capacitor component 100 according to an exemplary embodiment in the present disclosure includes a body 110 having a plurality of through-holes H, a first electrode 111, a first common electrode layer 211, a dielectric layer 112, a second electrode 113, a second common electrode layer 212, and external electrodes 131 and 132, and the first common electrode layer 211 is connected to the first external electrode 131 on a side surface, and the second common electrode layer 212 is connected to the second external electrode 132 on a side surface.

Figure 3:
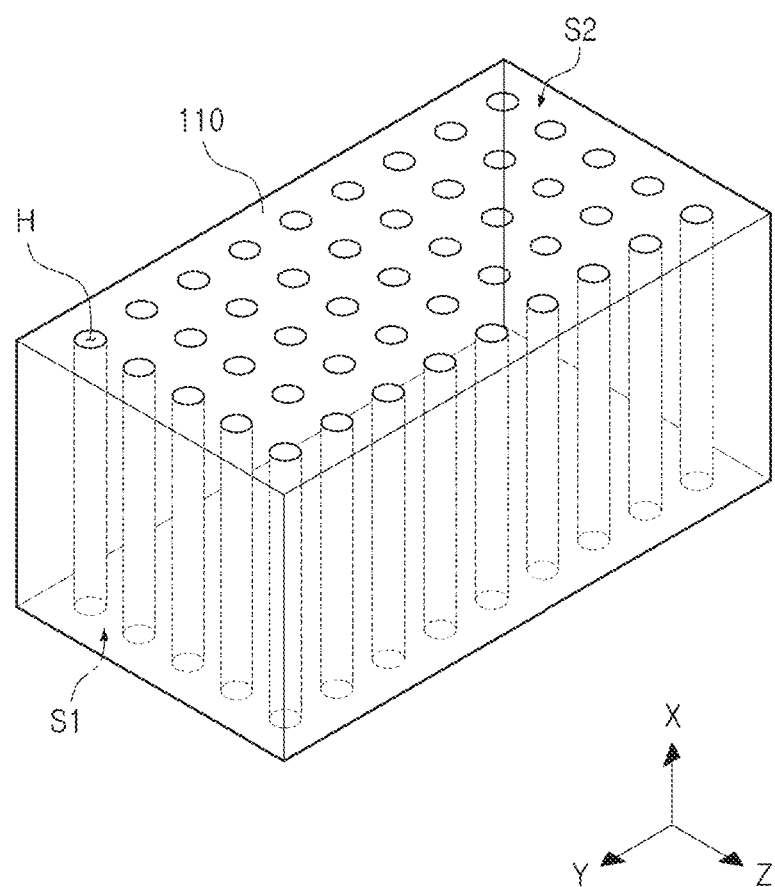
FIGS. 3 to 6 are views separately illustrating main components of the capacitor component in the exemplary embodiment of FIG. 1.
Figure 4:
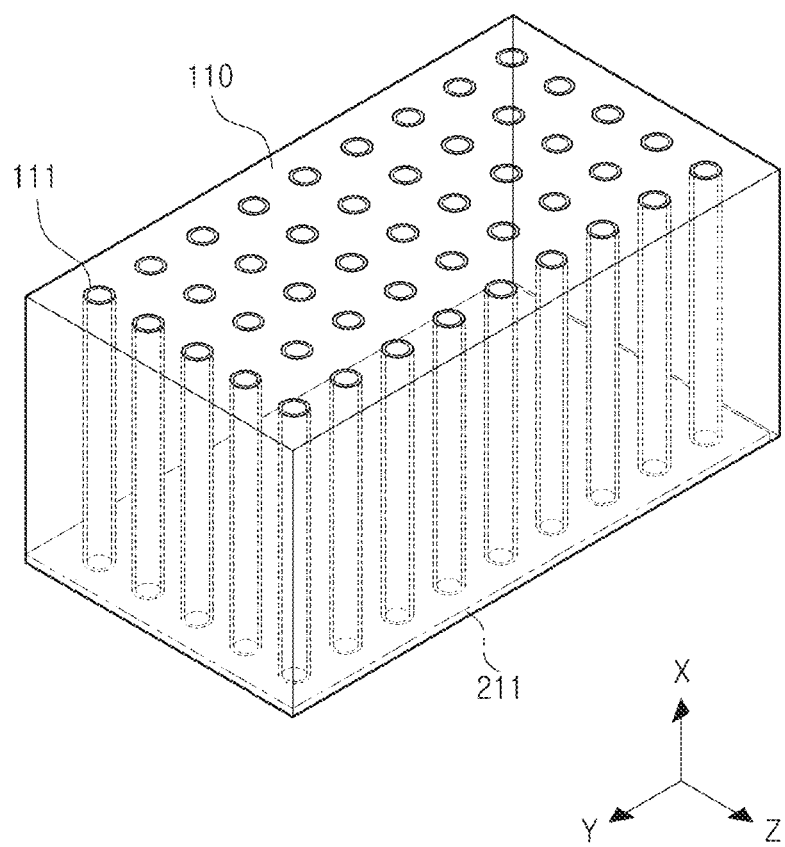
Figure 5:
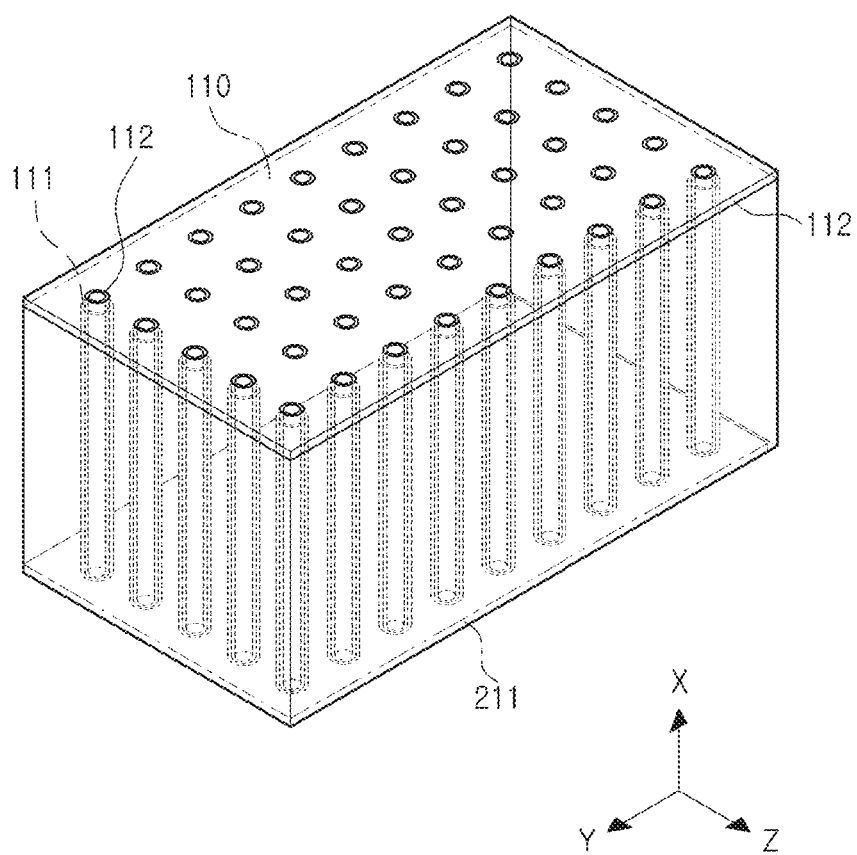
Figure 6:
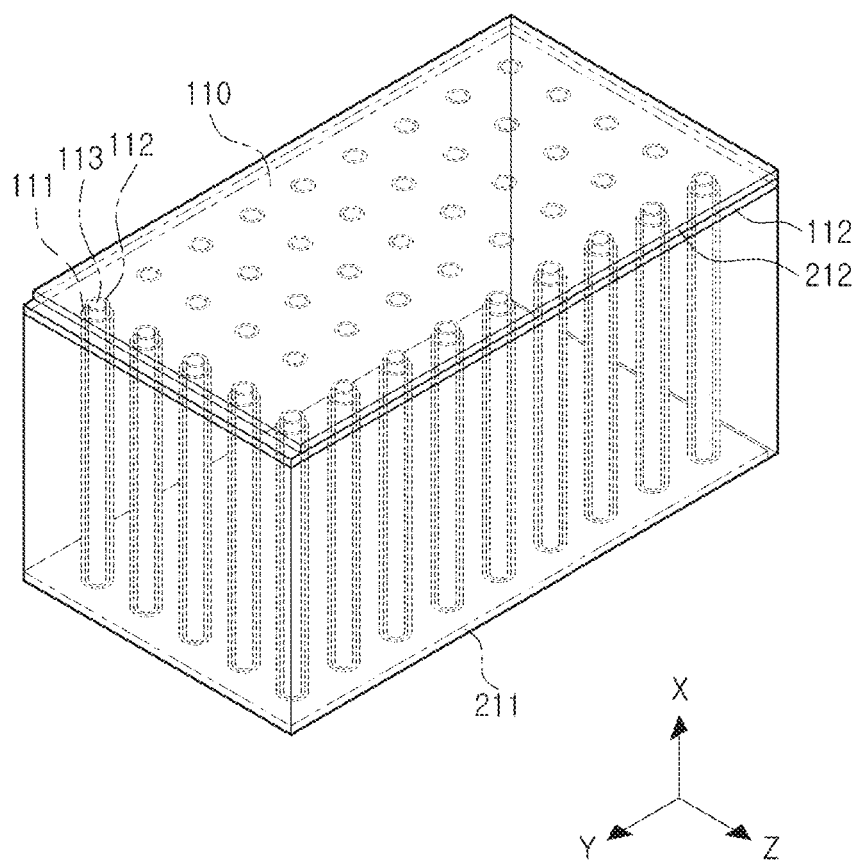

Hereinafter, main components of the capacitor component 100 will be described with reference to FIGS. 3 to 6 together. In FIGS. 3 to 6, an internal shape of only some of the plurality of through-holes H is illustrated in the dotted line, and the other through-holes H (which are omitted in illustration) may have the same shape. Since the body 110 includes the plurality of through-holes H penetrating through the body 110 in the first direction (X-direction), the body 110 has a large surface area. As illustrated, the plurality of through-holes H may completely penetrate through the body 110 in the first direction (X-direction), and accordingly, a surface area of a capacitor region is maximized, thereby effectively increasing electric capacity of the capacitor component 100. Here, the capacitor region corresponds to a region including the first electrode 111, the dielectric layer 112, and the second electrode 113 and functioning as a capacitor. As an example, as shown in FIG. 3, the through-hole H may be implemented in a cylindrical shape, although the shape of the through-hole H may not be limited thereto. Also, the plurality of through-holes H may be regularly arranged in a lattice structure.

The body 110 may be formed of an electrically insulating material, for example, silicon or ceramic, and the through-hole H may be formed in the body 110 by a method such as laser machining. In addition, the body 110 may be an anodized member obtained by anodizing a metal, for example, a valve metal such as aluminum (Al), zirconium (Zr), titanium (Ti), tungsten (W), to form the body 110. In addition, the through-hole H may be formed during the anodization process of the body 110.

The first electrode 111 covers an inner wall of the through-hole H of the body 110 and forms a part of the electrode portion of the capacitor. The first electrode 111 may use a metal having excellent electrical conductivity, such as Ag, Cu, Pt, Ni, etc., and may use a process such as atomic layer deposition (ALD) to be effectively formed on the inner wall of the fine through-hole H. The first common electrode layer 211 covers the first surface S1 among the first surface S1 and the second surface S2, perpendicular to the first direction (X-direction), facing each other in the body 110, and are connected to one electrode 111. The first common electrode layer 211 may be formed by, for example, applying a conductive paste including a metal or the like. Also, the first electrode 111 and the first common electrode layer 211 may be formed as an integral structure, and to this end, the first electrode 111 and the first common electrode layer 211 may be formed by the same process.

The dielectric layer 112 is disposed to be surrounded by the first electrode 111 in the through-hole H. The dielectric layer 112 may be formed of a dielectric material, for example, alumina ($Al_2O_3$), $SiO_2$, $Sn_3N_4$, $ZrO_2$, $CaTiO_3$, $SrTiO_3$, (Ba, Sr)$TiO_3$, $BaTiO_3$, or the like. In this case, the dielectric layer 112 may be formed of a plurality of materials to increase insulating properties. As shown, the dielectric layer 112 may extend to cover the second surface S2 of the body 110. In addition, a region of the dielectric layer 112 covering the second surface S2 of the body 110 may be disposed between the body 110 and the second common electrode layer 212. In addition, the region of the dielectric layer 112 covering the second surface S2 of the body 110 may be in contact with the second surface S2 of the body 110.

The second electrode 113 is formed to be surrounded by the dielectric layer 112 in the through-hole H. The second common electrode layer 212 covers the second surface S2 of the body 110 and is connected to the second electrode 113. The second electrode 113 constitutes the electrode portion of the capacitor unit and fills the through-hole H to have a large surface area, thereby increasing capacitance of the capacitor component 100. The second electrode 113 may be formed by filling the through-hole H with a conductive paste or by a plating process. In addition, the second electrode 113 may be formed using a conductive polymer. The second common electrode layer 212 may be formed by, for example, applying a conductive paste including a metal or the like. In addition, the second electrode 113 and the second common electrode layer 212 may be formed as an integral structure, and to this end, the second electrode 113 and the second common electrode layer 212 may be formed by the same process.

In the case of the structure described above, the second electrode 113 may be formed to be longer than the through-hole H. That is, as shown in FIG. 2, based on length in the first direction (X-direction), a length L2 of the second electrode 113 disposed on the innermost portion of the through-hole H may be longer than a length L1 of the through-hole H.

The first external electrode 131 is disposed on at least one of a plurality of side surfaces connecting the first surface S1 and the second surface S2 of the body 110, and in this exemplary embodiment, the three side surfaces are covered. In addition, the first external electrode 131 may extend from the side surface of the body 110 to the first surface S1 and the second surface S2. The first external electrode 131 is connected to a side surface of the first common electrode layer 211, and in FIG. 2, a contact region of the first external electrode 131 and the first common electrode layer 211 is denoted by C1. As a specific example, the first common electrode layer 211 may be connected to the first external electrode 131 on the first surface S1 of the body 110 and may not be connected to the second external electrode 132.

Similarly, the second external electrode 132 is disposed on at least one of a plurality of side surfaces connecting the first surface S1 and the second surface S2 of the body 110, and in this exemplary embodiment, the three side surfaces are covered. In addition, the second external electrode 132 may extend from the side surface of the body 110 to the first surface S1 and the second surface S2. The second external electrode 132 is connected to the side surface of the second common electrode layer 212, and a contact region of the second external electrode 132 and the second common electrode layer 212 is denoted by C2 in FIG. 2. As a specific example, the second common electrode layer 212 may be connected to the second external electrode 132 on the second surface S2 of the body 110 and may not be connected to the first external electrode 132.

Meanwhile, the first and second external electrodes 131 and 132 may be formed by preparing a paste of a material containing a conductive metal and then applying the paste to the body 110. The conductive metal may include, for example, nickel (Ni), copper (Cu), palladium (Pd), gold (Au), or alloys thereof. Here, the first and second external electrodes 131 and 132 may further include a plating layer including Ni, Sn, or the like.

The insulating layer 121 is disposed outside the first and second common electrode layers 211 and 212 in the first direction (X-direction) to cover the first and second common electrode layers 211 and 212 and may perform a function of protecting the elements described above as a whole. To this end, as shown in FIG. 1, the insulating layer 121 may also cover the side surface of the body. As described above, the first common electrode layer 211 may not be connected to the second external electrode 132 on the first surface S1 of the body 110, and to this end, as illustrated, the insulating layer 121 may be disposed between the first common electrode layer 211 and the second external electrode 132. In addition, the second common electrode layer 212 may not be connected to the first external electrode 131 on the second surface S2 of the body 110, and to this end, the insulating layer 121 may be formed between the second common electrode layer and the first external electrode 131. The insulating layer 121 may be formed of a metal oxide such as $SiO_2$, $TiO_2$, $Al_2O_3$, or a ceramic, or a polymer.

Figure 7:
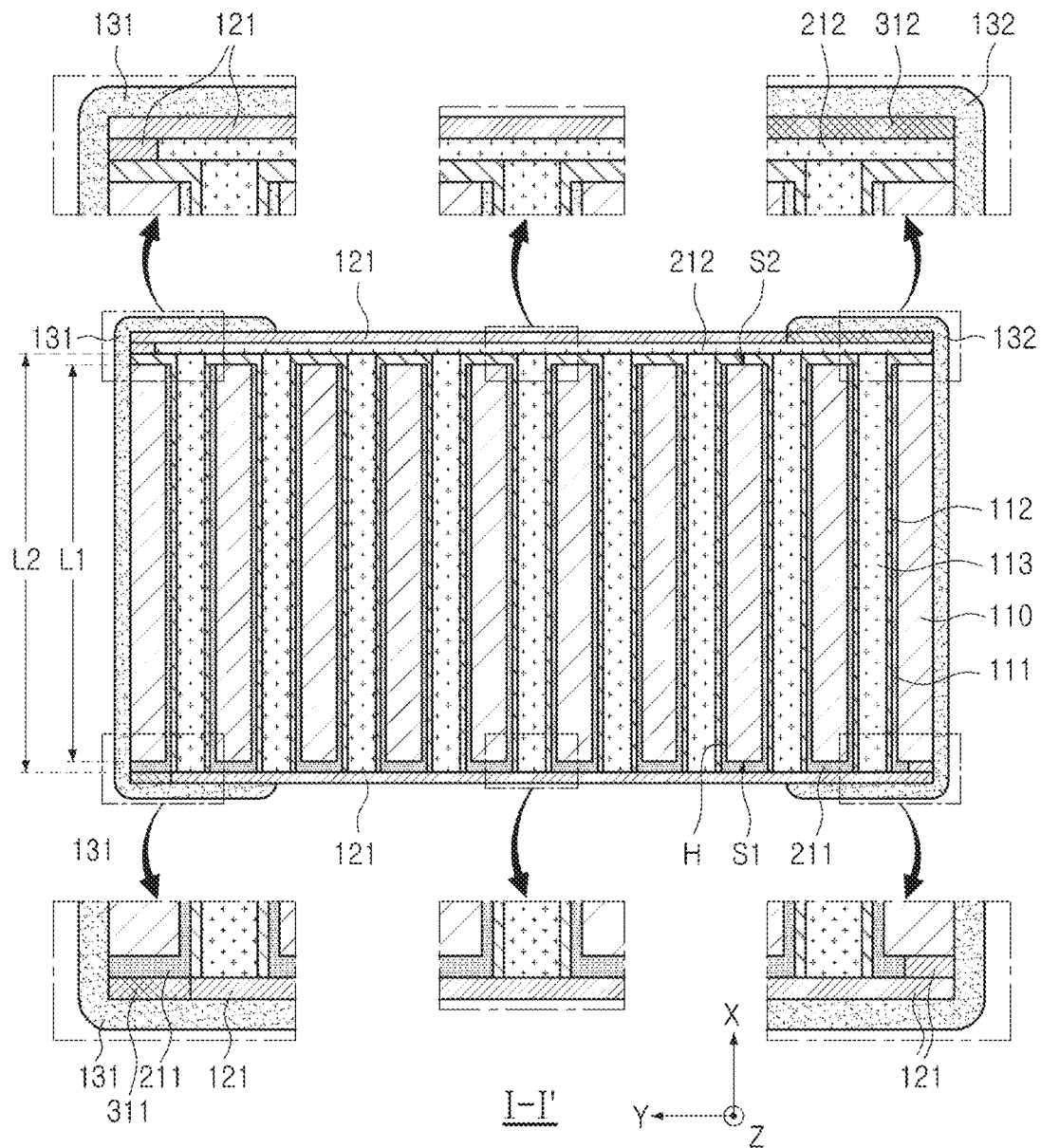
FIGS. 7 and 8 illustrate a capacitor component according to a modified example.

Hereinafter, modified examples of the present disclosure will be described with reference to FIGS. 7 and 8. First, the exemplary embodiment of FIG. 7 is different from the previous exemplary embodiment only in the connection region between the common electrode layers 211 and 212 and the external electrodes 131 and 132. Specifically, a first connection layer 311 may be provided on the first surface S1 side of the body 110 and may be disposed between the first common electrode layer 211 and the first external electrode 131 to connect them. In this case, the first connection layer 311 may be disposed on the same level as that of the insulating layer 121 with respect to the first surface S1 of the body 110. A second connection layer 312 may be provided on the second surface S2 side of the body 110 and disposed between the second common electrode layer 212 and the second external electrode 132 to connect them. In this case, the second connection layer 312 may be disposed on the same level as that of the insulating layer 121 with respect to the second surface S2 of the body 110.

Figure 8:
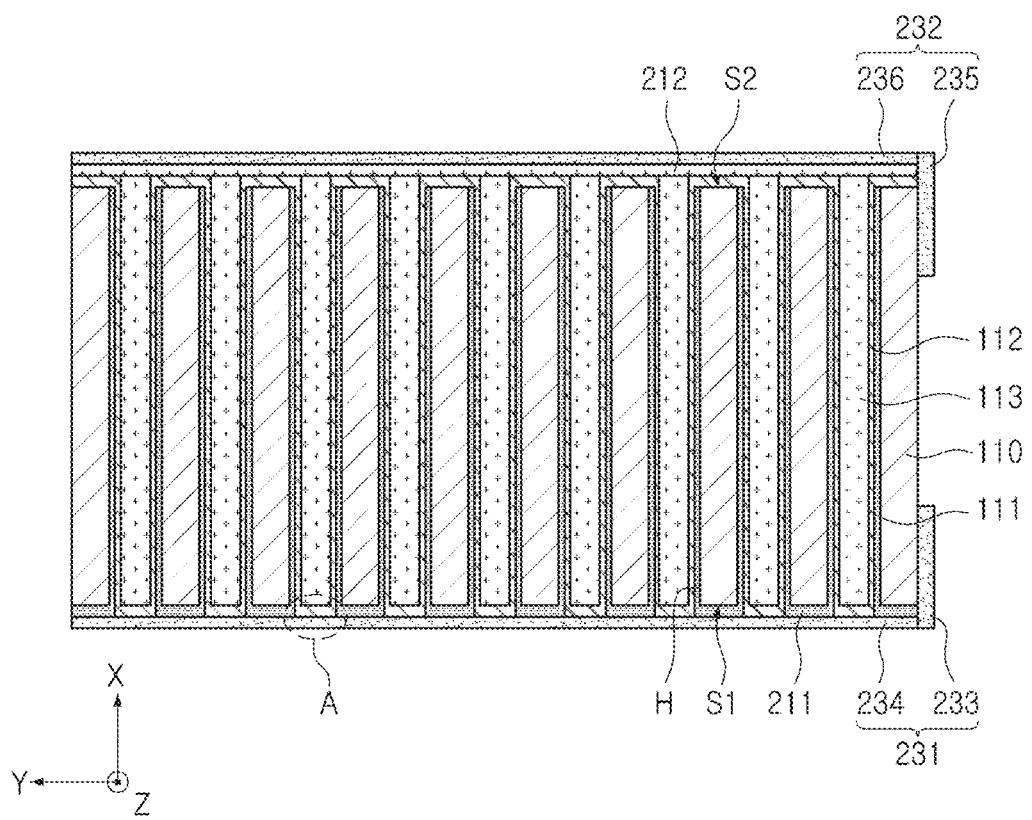

Next, in the case of the exemplary embodiment of FIG. 8, there is a difference in a specific shape of the external electrodes 231 and 232. As illustrated, the first and second external electrodes 231 and 232 may be disposed on the same side surface of the body 110. In this case, the first external electrode 231 may include a side cover region 233 of the body 110 to cover the first common electrode 211 on the first surface S1 side of the body 110 and include a region 234 extending to be connected thereto. In addition, the second external electrode 232 may include a side cover region 235 of the body 110 to cover the second common electrode 212 on the second surface S2 side of the body 110 and include a region 236 extending to be connected thereto. As the shapes of the first and second external electrodes 231 and 232 are changed, a shape of the dielectric layer 112 may also change. Specifically, the dielectric layer 112 may extend to be disposed between the first common electrode layer 211 and the second electrode 113, and a corresponding region is denoted by A. As in the present exemplary embodiment, by deforming the external electrodes 231 and 232, the capacitor component may be used as an electrode structure, and the capacitor component may be mounted through the side cover regions 233 and 235 of the body 110, among the first and second external electrodes 231 and 232.

As set forth above, in the case of the capacitor component according to an exemplary embodiment in the present disclosure, as the capacitor region has a large surface area, the electric capacity may be improved.

While example exemplary embodiments have been shown and described above, it will be apparent to those skilled in the art that modifications and variations could be made without departing from the scope of the present disclosure as defined by the appended claims.

What is claimed is:
1. A capacitor component comprising:
 a body having a first surface and a second surface opposing each other in a first direction of the body and including a plurality of through-holes penetrating through the first surface and the second surface;
 a first electrode covering an inner wall of one or more of the plurality of through-holes;
 a first common electrode covering the first surface and connected to the first electrode;
 a dielectric layer surrounded by the first electrode in the one or more of the plurality of through-holes;
 a second electrode surrounded by the dielectric layer in the one or more of the plurality of through-holes;
 a second common electrode layer covering the second surface and connected to the second electrode;
 a first external electrode disposed on at least one of a plurality of side surfaces connecting the first and second surfaces to each other in the body and connected to a side surface of the first common electrode layer; and
 a second external electrode disposed on at least one of the plurality of side surfaces connecting the first and sec- ond surfaces to each other in the body and connected to a side surface of the second common electrode layer, wherein the first external electrode is connected to the first common electrode layer at the at least one of the plurality of side surfaces, where the first external electrode is disposed, the second external electrode is connected to the second common electrode layer at the at least one of the plurality of side surfaces, where the second external electrode is disposed, one of the first external electrode and the second external electrode is in contact with the dielectric layer, and the dielectric layer extends from a region between the first electrode and the second electrode to be in contact with a portion of the second surface of the body disposed between two of the plurality of through-holes.

2. The capacitor component of claim 1, wherein the first electrode and the first common electrode layer have an integral structure.

3. The capacitor component of claim 1, wherein the second electrode and the second common electrode have an integral structure.

4. The capacitor component of claim 1, wherein the dielectric layer extends to cover be in contact with portions of the second surface of the body respectively adjacent to the first and second external electrodes.

5. The capacitor component of claim 1, wherein the plurality of through-holes are regularly arranged in a lattice structure.

6. The capacitor component of claim 1, further comprising an insulating layer disposed on an outer side of the first and second common electrode layers in the first direction to cover the first and second common electrode layers.

7. The capacitor component of claim 6, wherein the insulating layer disposed on the first surface is in contact with the dielectric layer.

8. The capacitor component of claim 1, wherein the first common electrode layer is connected to the first external electrode and is not connected to the second external electrode on the first surface of the body.

9. The capacitor component of claim 1, wherein the second common electrode layer is connected to the second external electrode and is not connected to the first external electrode on the second surface of the body.

10. The capacitor component of claim 1, wherein in the first direction, a length of the second electrode is greater than a length of the body.

11. The capacitor component of claim 1, wherein the second electrode protrudes from the first surface and the second surface.

12. The capacitor component of claim 1, wherein the first and second external electrodes extend from side surfaces of the body to the first and second surfaces.

13. The capacitor component of claim 12, further comprising:

a first connection layer disposed between the first common electrode layer and the first external electrode on the first surface of the body and connecting the first common electrode layer and the first external electrode.

14. The capacitor component of claim 12, further comprising:

a second connection layer disposed between the second common electrode layer and the second external electrode on the second surface of the body and connecting the second common electrode layer and the second external electrode.

15. The capacitor component of claim 1, wherein the first and second external electrodes are disposed on the same side surface of the body.

16. The capacitor component of claim 15, wherein the first external electrode covers the first common electrode on the first surface of the body and extends to be connected to the first common electrode, and the second external electrode covers the second common electrode on the second surface of the body and extends to be connected to the second common electrode.

17. The capacitor component of claim 16, wherein the dielectric layer extends to be disposed between the first common electrode and the second electrode.

18. A capacitor component comprising:

a body having a first surface and a second surface opposing each other in a first direction of the body and including a plurality of through-holes penetrating through the first surface and the second surface;

a first electrode covering an inner wall of one or more of the plurality of through-holes;

a first common electrode covering the first surface and connected to the first electrode;

a dielectric layer surrounded by the first electrode in the one or more of the plurality of through-holes;

a second electrode surrounded by the dielectric layer in the one or more of the plurality of through-holes;

a second common electrode layer covering the second surface and connected to the second electrode;

a first external electrode disposed on at least one of a plurality of side surfaces connecting the first and second surfaces to each other in the body and connected to a side surface of the first common electrode layer; and a second external electrode disposed on at least one of the plurality of side surfaces connecting the first and second surfaces to each other in the body and connected to a side surface of the second common electrode layer, wherein the first external electrode is connected to the first common electrode layer at the at least one of the plurality of side surfaces, where the first external electrode is disposed, the second external electrode is connected to the second common electrode layer at the at least one of the plurality of side surfaces, where the second external electrode is disposed, one of the first external electrode and the second external electrode is in contact with the dielectric layer, the dielectric layer extends to cover the second surface of the body, and a region of the dielectric layer covering the second surface of the body is disposed between the body and the second common electrode.

* * * * *